United States Patent [19]

Yamane

[11] Patent Number: 4,772,480

[45] Date of Patent: Sep. 20, 1988

[54] METHOD OF CONTROLLINGLY AGING EDIBLE MATERIAL

[76] Inventor: Akiyoshi Yamane, 577-1, Yonehara, Yonago-Shi, Tottori, Japan

[21] Appl. No.: 867,500

[22] Filed: May 28, 1986

[30] Foreign Application Priority Data

Jun. 6, 1985 [JP] Japan ................................. 60-121563

[51] Int. Cl.$^4$ ............................................... A23L 3/36
[52] U.S. Cl. ..................................... 426/327; 426/524; 426/557; 426/582; 426/589; 426/634; 426/641; 426/643; 426/644
[58] Field of Search ............... 426/524, 281, 327, 385, 426/589, 641, 643, 582, 557, 634, 644, 592

[56] References Cited

U.S. PATENT DOCUMENTS 2,839,410  6/1958  Helgerud et al. .................... 426/327
4,555,410  11/1985  Yamane .............................. 426/384

FOREIGN PATENT DOCUMENTS 56-36887  8/1981  Japan .

Primary Examiner—Donald E. Czaja
Assistant Examiner—Celine T. Callahan
Attorney, Agent, or Firm—Stewart L. Gitler; Martin P. Hoffman; Mitchell B. Wasson

[57] ABSTRACT

A method of controlling the aging or maturing of edible material such as meats, fish, dairy products, cereals, etc. by keeping the edible material in the presence of a freezing point depressing agent and an extract from the edible material at a temperature ranging from 0° C. to the freezing point of the material whereby the resultant flavor and/or taste of the edible material is improved.

9 Claims, No Drawings

METHOD OF CONTROLLINGLY AGING EDIBLE MATERIAL

FIELD OF THE INVENTION

The present invention relates to a method of controllingly aging edible material by keeping a variety of edible material including edible meat, dairy products, cereals, and various food materials at the temperature lower than 0° C. but without freezing of the edible material, for relatively long period.

DESCRIPTION OF THE PRIOR ART

The inventor of the present invention previously provided the improved method of preserving edible material such as fresh fruits and vegetables, for prolonged period of time without loss of their freshness, which comprises dipping them in a fluid of the concentration somewhat higher than that of the original fluid extracted from the original fruits or vegetables at the temperature of 0° C. to minus 0.5° C. for 5 days to 10 days and then cooling gradually at the temperature of minus 0.5° C. to minus 3.0° C. for 10 days to 30 days, in Japanese Patent Publication No. 56(1981)-36887. Further, the inventor of this application provided previously a process of the production of dried edible material which comprises treating fresh food or edible products in the presence of a freezing-point controlling agent, in the other words, cold treating at the lower temperature of 0° C. to minus 3° C. so as to impart the cold-resistance by controlling the non-freezing state to the material or products, and then, blowing chilled air blow of minus 0.5° C. to minus 10° C., in U.S. Pat. No. 4,555,410.

The former method needs longer period of time and too many steps of the treatment, because the starting materials such as fruits and vegetables have to be cooled and kept at the lower temperature such as below 0° C. for 15 days to 30 days in separate two steps to be treated in non-freezing condition.

In addition, in the latter method for the production of dried food by treating a starting material under the controlled non-freezing condition in chilled air for long period of time, edible materials have not to be frozen even in a chilled air below 0° C. so that the materials to be treated must be controlled under non-freezing state.

SUMMARY OF THE INVENTION

It is an object of the present invention to provide a method of controllingly aging edible material for a pre-treatment of the production of dried food by blowing chilled air to fresh fruits, vegetables, and fresh food and processed food, which comprises aging controllingly edible material such as edible meats, dairy products, cereals, vegetables or intermediates produced from those edible materials by utilizing the lower temperature range of 0° C. to the freezing point of the material to be treated.

It should be understood that the term "aging of edible material" is used broadly herein to mean a process to impart the improved taste or flavor to the food (original edible material) by aging edible material to modify the taste and/or the flavor of the original edible material by strengthening or improving the tasty components or flavoring components for the edible material, and in the general meaning, including the production of the taste or flavor specific to the edible material, such as taste contributory (flavoring) amino acid group, or the product from the decomposition of polypeptides, for example, by enzymatic hydrolysis of the components contained in the original edible material, or formulation change of organic acids, or the production of taste contributing (flavoring) nucleic acid group, i.e. the product from the decomposition of the nucleic acids and the production or modification of flavoring components in the edible material.

DETAILED DESCRIPTION OF PREFERRED EMBODIMENTS

In accordance with the present invention, a variety of edible materials, including fish meat, poultry meat, meat of domesticated animals, dairy materials such as cheese, cereal material, vegetables, and intermediate products of edible meats, and other edible materials are kept under the presence of a freezing point depressing agent for a longer period of time at the lower temperature of 0° C. to the freezing point of said material to hold the non-freezing state, if necessary, adding a concentrated extract prepared from the orginal edible material to be treated, so that the said materials can be aged controllingly under non-freezing condition, but very cold state in which any bacteria can not grow nor live.

Hereinafter, the term "fish meat" may include slice ("kirimi"), cut pieces("otoshimi"), fillet, minced meat, and any shape of meat of sardine, mackerel, Alaska pollack, tuna, and other edible fish.

The term "poultry meat" may include edible meat of domesticated fowls, such as chickens (including broiler meat), turkeys, ducks and geese, local interest guinea fowls, peafowls, pigeons, pheasants and other wild fowls such as wild ducks.

The term "meat of domesticated animals" may include edible meat such as steak, slice, minced meat and any shape of meat of cattle, and livestock and draft animals, such as cows, bulls, steers, pigs, sheep, horse and the other domestic animals.

Further, the term "intermediate product in the production of the food from the raw materials may include dough for bread, noodles and the like, whole soy bean fluid prepared from soy beans in use for the production of "tofu" and the like, soy bean milk ("tonyu"), the intermediate material ("moromi") for the production of rice wine (Japanese "sake"), the intermediate material for the production of wine and the other alcoholic liquid, "green" sake, and raw beer, and green cheese in the production of cheese, and the like.

The specific temperature at which the edible material is treated for aging to improve the flavor and/or taste of the material is in the range of below zero degree Centigrade (0° C.) to the freezing point of the material to be treated because it can provide easily the state of non-freezing and the condition under which harmful microorganisms can not grow nor multiply. Such temperature is referred to "lower temperature of 0° C. to the freezing point". The "lower temperature of 0° C. to the freezing point" means the temprature range of below 0° C. to the freezing point of the edible materials to be aged or/and treated in which range the edible material to be treated is controllingly aged with the prevention of the edible materials from decomposing and putrefying. That means that the edible material shall not be frozen below zero degrees Centigrade, but any harmful bacteria can not grow nor live in the edible material during aging treatment.

The "freezing-point depressing agent" is used to depress the freezing point of the edible material to be treated so as to keep the non-freezing condition under which the edible material is not decomposed nor putrefied.

The "freezing-point depressing agent" is used to depress the freezing point of the edible material to be treated so as to keep the non-freezing condition under which the edible material is not decomposed nor putrefied.

The freezing-point depressing agent may be edible salt, saccharides, sodium malate, ethyl alcohol, sorbitol, propylene glycol, higher alcohol and the other edible and non-toxic material, and the combination thereof with flavoring and/or tasting and/or seasoning agents can be used in the materials to be treated. Further, the wordings "under the presence of freezing-point agent(s)" may mean the inclusion of the freezing-point depressing agent such as saccharides and sugar in the cereal materials such as bread product, that has been contained originally in the raw material(s).

In accordance with the present invention, the extract concentrated from the material to be treated can be used, if necessary. The extract used for the present invention is prepared by concentrating or condensing or removing water from the liquid or extract, juice, broth, or soup of the material to be treated, and therefore, it can be called as the concentrated liquid, juice, broth or soup of the material. Such extract may mean the liquid of the original material that is concentrated into about one fifth of the original volume of the material at the temperature of minus 2° C. to the freezing point which is prepared from the material to be treated. For example, the concentrated juice, extract, liquid, broth or soup prepared from the material such as fish or meat to be treated can be produced by mincing the raw material, and pressing to yield the broth or soup of the material, and enzymically treating the broth or soup (by selecting the species of the enzyme to be used upon depending on the species of the material, for example, protease about 0.5%, spleen of pig about 20%, *Aspergillus oryzae* (malted yeast) about 0.5%), exploiting under reduced pressure, and vacuum freezing, to concentrate into about one fifth volume of the original one so as to produce the liquid having the freezing point at minus 2° C. Further, in case of vegetables, the concentrated extract can be produced by mincing the vegetable and adding ascorbic acid in the amount of about 0.02% to the minced vegetable, filtering in reduced pressure, vacuum freezing to concentrate into the liquid having the freezing point at minus 1° C. that is corresponding to the concentration ratio of about 1/5 of the original material. The use of the original material concentration can restrain degrading of the material(food) that could be caused when only the freezing point depressing agent is used. Then, the inventive process can effectively age the edible material to promote the good flavor of the material.

In accordance with the present invention, the food or edible materials such as edible meat, dairy, cereals, and vegtables are lower temperature treated at the temperature of below 0° C. without freezing of the material for aging of the material by adding a freezing point depressing agent(s) to the material to be treated at the level not to affect the taste and flavor of the material and further, if necessary, adding the concentration or concentrated soup, broth or juice of the material to be treated, so as to depress the freezing point of the material to be aged.

When the edible material is stored at positive temperature above the zero degrees Centigrade its taste or flavor will be changed and in some cases improved by the function of action of the enzymes contained therein, but the harmful microorganisms such as common bacteria, pathogenic bacteria, fungi, and the like will be multiplied to cause reduction or degrading of its freshness and/or flavor and furthermore to putrefy the material. However, in accordance with the inventive method of aging or storing, such harmful microorganisms will be prevented from multiplying and further, at the same time, the amino acid that will contribute to improving the flavor of the material is increased so that the material being treated becomes more tasty and having milder flavor with keeping the original texture and/or softness.

The term "aging" herein is referred to include the effect of changing with the passage of time chemically the flavor constituents or components in the edible material to acquire desired flavor or taste components as it becomes mellow or mature, and the technique of bringing to a state of maturity or ripeness of the edible material, in that generally the components or the composition of the material are changed by enzymatic hydrolysis of the components to produce flavoring amino acids group by the decomposition of polypeptides, and/or to change the formulation of organic acids, and/or to produce the flavoring nucleic acids group by the decomposition of nucleic acids, and/or to change the flavoring formulation of the material, so that the totally changing of the composition generates or strengthens the specific flavor or taste of the material.

In the inventive method of aging, the growth or increase of microorganisms to degrade the flavor of the material can be restrained so that the material can be preserved for longer time.

The aging of the dough or wheat flour product may include the increase in free flavoring amino acids and proteins such as glutamic acid, aspartic acid alanine and the like, and further may include the increase in lysine content in the material and may provide the improved balance of essential amino acids.

The conventional storage method of the edible material under the freezing condition is not appropriate for aging process, because the freezing of the material will destroy cells of the material's constituents and further, the original texture or flavor or softness of the material could be lost. However, the inventive method of aging the material can preserve relatively the original freshness, original flavor and original softness of the material.

Any known refrigerator can be employed for the inventive method of controllingly aging or keeping the edible material at the specific temperature range of below zero degrees Centigrade to the freezing point of the material. For example, the apparatus as shown in FIG. 1 in the above mentioned U.S. Pat. No. 4,555,410, that is provided to dry the edible material in the Patent, can be employed in this invention too. The drying chamber of the apparatus can be used to maintain or keep the edible material at the specific temperature for longer period of time.

Further the present invention and the features of the present invention can be illustrated by the following examples, but which should not be interpreted for the limitation of the invention.

EXAMPLE 1

Cut meat ("otoshimi") of sardine was immersed in the fluid of the 1/5 concentration prepared from sardine meat (having the freezing point of minus 5° C.) in the amount of 20% of the weight of the sardine meat, and then to the treated material, 2.2% of 2 weight % aqueous solution of sodium malate based on the weight of the sardine meat was spread, and further, a 0.1% aqueous solution of ethyl alcohol was spread to the material. Then, 0.05% of a proteolytic enzyme (an enzyme extracted from Aspergillus oryzae) was added, and the treated material was kept in a refrigerator at the temperature of about 5° C. for about one month.

EXAMPLE 2

The fillets of sardine were dipped in a 1/5 concentrated solution of the sardine meat (having the freezing point of minus 5° C.) in the amount of 30% of the sardine fillets by weight, and then 0.1 weight % of pectinase, an enzyme extracted from Aspergillus oryzae 0.1% by weight, edible salt 5% by weight and sodium malate 2% by weight were spread to the fillets. The treated fillets were kept in a refrigerator at the temperature of minus 5° C. for about one month.

EXAMPLE 3

To the mixture of cut pork 70 part, pork fat 20 parts and water 10 parts, were 1/5 concentrated pork broth (having the freezing point at minus 6.5° C.) in an amount of 20% of the mixture added, and sodium nitrate 0.1 weight %, pepper 0.25 weight %, nutmeg 0.1 weight %, all-spice 0.05 weight % and cinnamon 0.03 weight % were further mixed, and then salted pork were prepared by salting process.

The prepared salted pork was kept in a refrigerator at the temperature of about minus 3° C. for 7 days to 10 days, and then, ground and kneaded and filled followed by heat treatment of the filled product so as to produce a final sausage product.

The resultant sausage produced associated with the aging treatment was found to have mild flavor and taste.

EXAMPLE 4

To 180 l. of milk, were 45 g. of calcium chloride added, and then, starch in an amount of 2% based on the weight of milk, and 3 g. of rennet added to form curd thereby to remove whey. The resulting mixture was filled in a mold and pressed to prepare green cheese. The resulting green cheese was mixed with 1/5 concentrated whey (having the freezing point at minus 4.5° C.) of 20% based on the weight of the cheese and salt of 1 to 2% based on the weight of the cheese, and then, was kept in a refrigerator at the temperature of minus 20° C. under the moisture percent of 75 to 85% for 10 months to 15 months.

EXAMPLE 5

To 10 Kg. of wheat flour, was 3.8 l. of salted alcoholic aqueous solution having Be' of 10, containing saline salt and ethyl alcohol added, and kneaded at the temperature of minus 2° C., for about 15 minutes to prepare dough. The resulting dough or a sheet formed from the dough was kept in a refrigerator at the temperature of minus 2.5° C. for 5 days for aging. The resulting dough after keeping under the lower temperature was pressed to form a sheet, which was cut into noodle form, or the resulting sheet after an aging treatment was cut into the noodle form.

In this example, alcohol was used as a freezing point depressing agent, in addition to saline salt, so that the freezing point could be furthermore depressed, and then the anti-bacteria effect was found as a by-effect so that green dough and green noodle can be preserved for longer period of time as a product.

EXAMPLE 6

Soy beans were dipped in water over night and ground to prepare mashed soy beans("Gojiru"), to which water in amount of 2 times or 3 times of the resulting mashed soy beans was added, and the mixture was heated to cook. 500 cc. of 1/5 concentration of soy bean milk (having the freezing point at minus 6.2° C.) that has been independently prepared was added to the mashed and cooked soy bean or the soy bean milk produced by pressing the mashed soy bean in a pressing machine kept preferably at 70° C. to 75° C., and further 20 cc. of magnesium chloride aqueous solution (a solution prepared by adding 370 g of magnesium chloride to 1.8 l. of water) was added as both of a freezing point depressing agent and a coagulating agent so as to coagulate the soy bean milk ("tonyu") into "tofu". The resulting "tofu" was kept in a refrigerator at the temperature of minus 2° C. for one month or two months.

The resulting half-coagulated "tofu" after keeping as above mentioned can be provided as an edible material as it is. Alternatively, the resulting half-coagulated tofu was put in a container, and covered with a cloth, and pressed with a weight to squeeze water so as to yield an enough hard "tofu" of the product which can be provided as an edible material.

In this example, other component such as saccharide originally contained in the "tofu" material or soy beans can effect freezing point depression in addition to the effect by the addition of magnesium chloride so that the resulting tofu can hold a non-freezing state even under such lower temperature.

EXAMPLE 7

In the manufacture of "sake"(rice wine), fermentation was continued through the first stage of fermenting ("hatuten"), the second stage of fermenting ("nakaten"), and the final stage of fermenting ("tometen") and the fermented mixture("moromi") was kept at about minus 1° C. for about one month for aging, "green" "sake" was obtained by squeezing "sake" liquid from the culture, and to the green "sake" were ethyl alcohol 5% based on the weight of the green "sake", and sorbitol 0.5% based on the weight of the green "sake" added as a freezing point depressing agent, and kept at the temperature of minus 1.5° C. for 5 months for aging and then, the resulting "sake" was sterilized or discontinueing fermentation by heating so as to produce finished "sake".

The resulting "sake" was found to have improved mild flavor of "sake".

EXAMPLE 8

100 G. of 1/5 concentration of mackerel meat broth (having the freezing point at minus 6° C.), and 80 g. of sodium chloride (edible salt) were used as a freezing point depressing agent, and dispersed into the meat of mackerel 400 g. that have been cut into the form of "sanmai". The resulting meat of mackerel was kept at the temperature of about minus 2° C. for 3 days, and then washed out salt, and then, dipped in vinegar mixture( of vinegar and water in equal weight) to rinse with vinegar and then immersed in another vinegar for 30 minutes to remove completely water, and dipped in 1/5 concentration of mackerel broth (having the freezing point at minus 5° C.) 100 g. and kept at the temperature of about minus 3° C. for 20 days for aging.

EXAMPLE 9

The 1/5 concentrated soup of sardine (having the freezing point at minus 5° C.) 2.5% based on the weight of the sardine meat to be treated was added to the meat of sardine which has been cut into "sanmai", and then, saline salt 4% based on the weight of the sardine meat was added. The resulting sardine cut meat was kept at the temperature of about minus 2° C. for 50 days, and then, ground into mashed meat ("surimi") by a grinding machine. The resulting ground meat ("surimi") without water rinsing ("mizusarashi") was mixed with sorbitol as a freezing point depressing agent, starch or/and japanese yam as a binder and enzyme extracted from Aspergillus oryzae and then, kept at the temperature of about minus 3° C. for 20 days.

In accordance with the present invention, the starting material to be treated was kept at the lower temperature after adding a concentrated soup or broth or juice that has been prepared by mincing or grinding or mashing the original material to be treated, as a freezing point depressing agent or material, so that the material can be aged or ripen for a longer period of time with prevention of harmful microorganisms or bacteria from multiplication, by keeping the material having a freezing point depressing agent and a concentrated liquid of the material at a lower temperature below zero centigrade but under the not -freezing condition for longer period of time to improve the taste and/or flavor of the edible material with preservation of the original softness and flavor of the material. Therefore, the material can be effectively and sufficiently aged or ripen to improve the taste or flavor of the material and then, can produce a good taste final product available in the market.

I claim:

1. A method for controlling the aging of an edible material which comprises:
    (a) keeping said edible material in the presence of:
        (I) an extract, broth, soup or concentrated juice prepared from said edible material to be treated, and
        (II) a freezing point depressing agent
    (b) keeping said material at a temperature ranging from 0° C. to the freezing point of said edible material to hold the non-freezing state for a period of time to age and thereby improve the resultant flavor and taste of said edible material.

2. The method as claimed in claim 1, wherein said freezing point depressing agent(s) are selected from the group consisting of sodium chloride, saccharides, sodium malate, ethyl alcohol, sorbitol, propylene glycol, concentrated juice prepared from said edible material to be aged and mixtures thereof.

3. The method as claimed in claim 2, wherein said extract, broth, soup or concentrated juice is prepared from said edible material by grinding, mashing or mincing said material and the concentrating same utilizing vacuum concentration techniques.

4. The method as claimed in claim 2, wherein the edible material to be treated is a fish product.

5. The method as claimed in claim 2, wherein the edible material to be treated is a meat product.

6. The method as claimed in claim 2, wherein the edible material to be treated is a cheese product.

7. The method as claimed in claim 2, wherein the edible material to be treated is a pasta product.

8. The method as claimed in claim 2, wherein the edible material to be treated is a soy bean product.

9. The method as claimed in claim 2, wherein the edible material to be treated is an alcoholic liquid.

* * * * *